United States Patent [19]
Kemstedt

[11] Patent Number: 4,591,964
[45] Date of Patent: May 27, 1986

[54] METHOD OF SECURELY INTERRUPTING THE ELECTRIC POWER SUPPLY FROM A LOW-FREQUENCY OR DIRECT VOLTAGE SOURCE TO A LOAD, AND APPARTUS FOR CARRYING OUT THE METHOD

[75] Inventor: Clas A. Kemstedt, Hägersten, Sweden

[73] Assignee: Telefonaktiebolaget LM Ericsson, Stockholm, Sweden

[21] Appl. No.: 540,369

[22] PCT Filed: Jan. 26, 1983

[86] PCT No.: PCT/SE83/00023
 § 371 Date: Sep. 30, 1983
 § 102(e) Date: Sep. 30, 1983

[87] PCT Pub. No.: WO83/02860
 PCT Pub. Date: Aug. 18, 1983

[30] Foreign Application Priority Data
 Feb. 5, 1982 [SE] Sweden ............................ 8200666

[51] Int. Cl.[4] ............................................ H02M 3/335
[52] U.S. Cl. ........................................ 363/24; 363/134
[58] Field of Search ........................... 363/24–26, 363/41–43, 56–57, 124, 97, 133–134

[56] References Cited

U.S. PATENT DOCUMENTS

| | | | |
|---|---|---|---|
| 3,657,631 | 4/1972 | Martens et al. | 363/26 |
| 3,869,658 | 3/1975 | Hanke et al. | 363/25 X |
| 3,970,916 | 7/1976 | Kienscherf | 363/41 X |
| 4,236,187 | 11/1980 | Mochizuki et al. | 363/56 X |
| 4,327,406 | 4/1982 | Ashley | 363/56 |

Primary Examiner—Peter S. Wong
Attorney, Agent, or Firm—Roberts Spiecens & Cohen

[57] ABSTRACT

The invention relates to a method and an apparatus for secure interruption of the supply of electric power from e.g. a low-frequency source (1) to a signal lamp (2) which when alight announces permission for a train to pass. The output voltage (a) of the source (1) is chopped by a chopper device (4) to a high-frequency alternating voltage (e,f) in response to a high-frequency input signal (b) to the chopper device (4) and is transferred from the primary to the secondary side of a transformer (5,6) as well as being rectified and filtered to form a voltage (k) applied to the signal lamp (2), said voltage (k) having a wave form corresponding to the wave form of the output voltage (a) of the source (1) and which is securely interrupted by interrupting the input signal (b) to the chopper device (4).

2 Claims, 12 Drawing Figures b 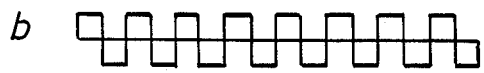
c 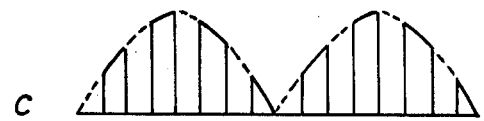
d 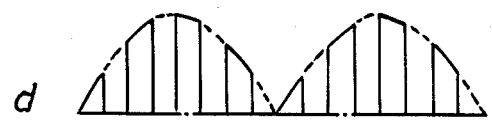
e 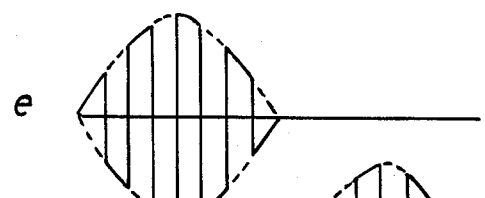
f 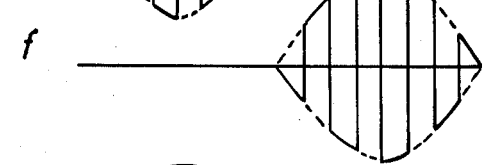
g 
h 
i 
j 
k 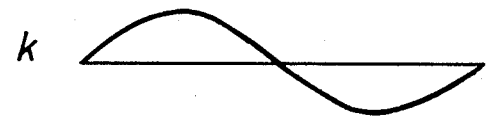

METHOD OF SECURELY INTERRUPTING THE ELECTRIC POWER SUPPLY FROM A LOW-FREQUENCY OR DIRECT VOLTAGE SOURCE TO A LOAD, AND APPARTUS FOR CARRYING OUT THE METHOD

FIELD OF INVENTION

The present invention relates to a method for interruption of the supply of electric power from a low-frequency or D.C. voltage source to a load, and also to an apparatus for carrying out the method.

BACKGROUND

In railway signalling technology, the interruption of electric power to a load is of the greatest importance, the load being e.g. a signal lamp which, when illuminated, announces "permission to pass" for a train. Relays have so far been used in the art to achieve this interruption. However, relays are burdened with the disadvantages that they are of large size as well as heavy, expensive to manufacture, and environmentally sensitive and in that they have limited working life with respect to the number of interruptions which can be expected.

SUMMARY OF INVENTION

An object of the present invention is to eliminate the disadvantages associated with relays in connection with their use in the above-indicated manner.

In achieving the above and other objects of the invention, there is provided a method of reliably controlling the energizing of a load comprising providing a source voltage having a low frequency or direct current voltage, controllably providing a chopping voltage having a frequency substantially greater than said low frequency, the chopping voltage being controllably switchable between on and off states, chopping said source voltage in response to said chopping voltage such that, when said chopping voltage is present, a high frequency voltage is generated, and coupling the high frequency voltage to the load solely through a high frequency path.

In further accordance with the invention, there is provided an apparatus for reliably effecting interruption of the supply of electric power from a low frequency or direct current voltage source to a load, said apparatus comprising high frequency voltage generating means for generating a high frequency control voltage, said high frequency voltage generating means being controllably switchable between off and on states, high frequency control voltage responsive chopper means for chopping the output voltage of said voltage source to a high frequency output voltage only when said high frequency control voltage is present, and galvanically isolating high frequency coupling means for coupling said high frequency output voltage to said load.

The above and other objects, features and advantages of the invention will be found in the detailed description which follows hereinafter as illustrated in the accompanying drawing.

BRIEF DESCRIPTION OF DRAWINGS

The invention will next be described in detail, with reference to the accompanying drawing wherein:

FIGS. 2a-2k illustrate the voltages at different points in the diagram of FIG. 1.

DETAILED DESCRIPTION

Figure 1:
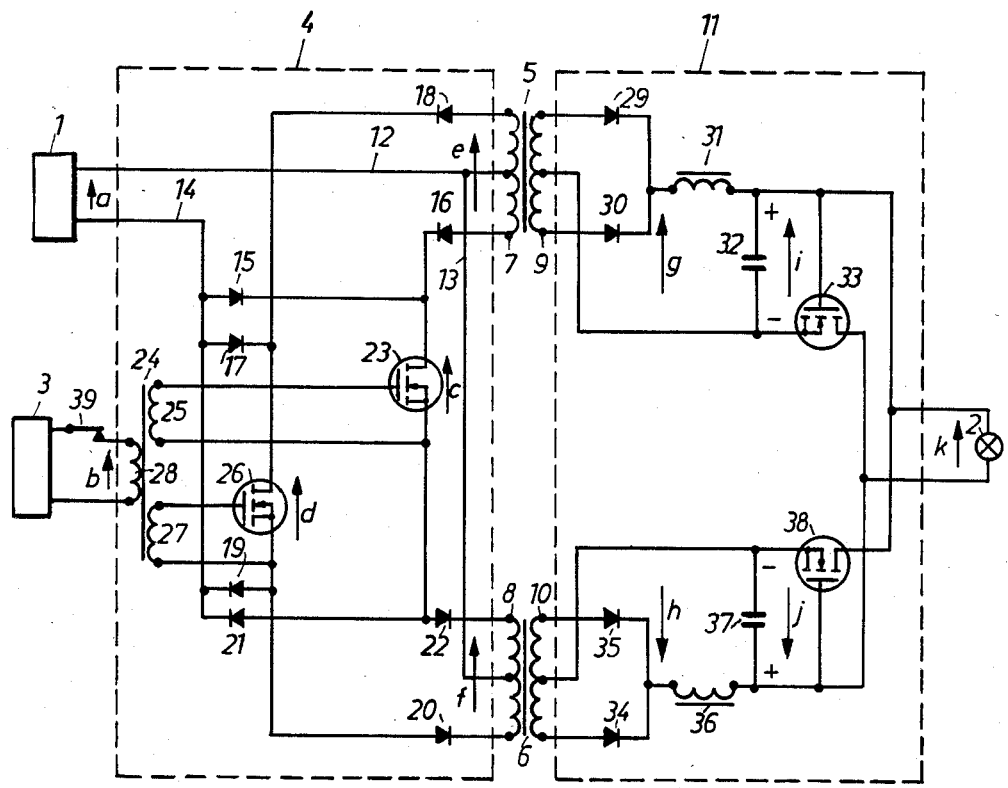
FIG. 1 is a circuit diagram of an embodiment of the invention.

FIG. 1 is a circuit diagram of an apparatus for reliably interrupting the supply of electric power from a low-frequency source 1 to a load 2. In the illustrated embodiment this load is assumed to be a railway signalling lamp which when it is lit announces passage permission to a train. A direct-current voltage source may of course be used instead of the low-frequency source 1.

Figure 2A:
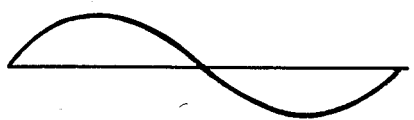

In accordance with the invention, the output voltage a of the low-frequency source 1 is applied to a chopper device 4, adapted for chopping the low-frequency voltage a, the wave form of which will be seen in FIG. 2a, to a high-frequency alternating-current voltage in response to a high-frequency signal b, the wave form of which will be seen in FIG. 2b, and which is supplied to the chopper device 4 from a signal source 3. The high-frequency input signal b to the chopper device 4 may be interrupted, as indicated in FIG. 1 by a break-contact 39. The high-frequency alternating-current voltage generated by the chopper device 4, illustrated in FIGS. 2e and 2f, is applied to an interface with the property of only being able to transfer high-frequency energy. In the embodiment illustrated, this interface includes two transformers 5 and 6, having primary windings 7 and 8, respectively. The respective secondary windings 9 and 10 of these transformers are connected to a rectifying and filtering device 11, for rectifying and filtering the high-frequency alternating-current voltages on the secondary sides of the transformers 5 and 6 to in a voltage k, the wave form of which will be seen from FIG. 2k, and which is applied to the signal lamp 2.

The illustrated apparatus is implemented such that the voltage k to the signal lamp 2 is reliably interrupted when the voltage b from the signal source 3 is interrupted.

One output terminal on the low-frequency source 1 is connected via a conductor 12 to the center tap of the primary winding 7 of the transformer 5, this tap being in turn connected by a conductor 13 to the center tap of the primary winding 8 of the transformer 6. The other output terminal of the source 1 is connected via a conductor 14 to:

(a) the anode of a diode 15, the cathode thereof being connected to the cathode of a diode 16, the anode of this diode being connected to one end of the primary winding 7 of the transformer 5, (b) the anode of a diode 17, the cathode thereof being connected to the cathode of a diode 18, the anode of this diode being connected to the other end of the primary winding 7 of the transformer 5, (c) the cathode of a diode 19, the anode thereof being connected to the anode of a diode 20, the cathode of this diode being connected to one end of the primary winding 8 of the transformer 6, and (d) the cathode of a diode 21, the anode thereof being connected to the anode of a diode 22, the cathode of this diode being connected to the other end of the primary winding 8 of the transformer 6.

The connection point between the cathodes of diodes 15 and 16 is connected to the collector of a field effect transistor 23, the emitter of which is connected to the connection point between the anodes of diodes 21 and 22, and the gate of which is connected to one end of a first secondary winding 25 of a transformer 24, the other end of said winding being connected to the emitter of the transistor 23.

The connection point between the cathodes of diodes 17 and 18 is connected to the collector of a field effect transistor 26, the emitter of which is connected to the connection point between the anode of diodes 19 and 20 and also to one end of a second secondary winding 27 of the transformer 24, the other end of said winding being connected to the gate of the transistor 26.

The primary winding 28 of the transformer 24 is connected via the break-contact 39 between the two output terminals of the voltage source 3.

One end of the secondary winding 9 of the transformer 5 is connected to the anode of a diode 29, the cathode thereof being connected to the cathode of a diode 30, the anode of this diode being connected to the other end of the winding 9. The connection point between the cathodes of diodes 29 and 30 is connected to one end of a coil 31, the other end of which is connected to (a) one terminal of a capacitor 32, the other terminal thereof being connected to the center tap of the secondary winding 9 of the transformer 5 and (b) the gate of a field effect transistor 33, having its emitter also connected to the center tap of the secondary winding 9 and its collector connected to one terminal of the signalling lamp 2, the other terminal of which is connected to the gate of the field effect transistor 33.

One end of the secondary winding 10 of the transformer 6 is connected to the anode of a diode 34, the cathode thereof being connected to the cathode of a diode 35, the anode of this diode being connected to the other end of the secondary winding 10. The connection point between the cathodes of diodes 34 and 35 is connected to one end of a coil 36, and the other end of this coil is connected to (a) one terminal of a capacitor 37, having its other terminal connected to the center tap of the secondary winding 10 of the transformer 6, and (b) the gate of a field effect transistor 38, having its emitter also connected to the center tap of the secondary winding 10, and its collector connected to the gate of the transistor 33, the collector of which is in turn connected to the gate of the transistor 38.

When the voltages according to FIGS. 2a and 2b appear at the respective outputs of the low-frequency source 1 and the voltage source 3, the emitter-collector voltage of the field effect transistor 23 will have the appearance shown in FIG. 2c, while the emitter-collector voltage of the field effect transistor 26 will have the appearance shown in FIG. 2d.

The voltage across the primary winding 7 of the transformer 5 will have the appearance shown in FIG. 2e, while the voltage between the connection point of the diodes 29 and 30 and the center tap on the secondary winding 9 of the transformer 5 will have the appearance shown in FIG. 2g.

The voltage across the primary winding 8 of the transformer 6 will have the appearance shown in FIG. 2f while the voltage between the connection point of diodes 34 and 35 and the center tap on the secondary winding 10 of the transformer 6 will have the appearance shown in FIG. 2h.

The voltages from the secondary windings of the transformers 5 and 6 are rectified with the aid of diodes 29, 30 and 34, 35, respectively, while the high-frequency components from the chopper device 4 are filtered out by the filters including coil 31 and capacitor 32 and coil 36 and capacitor 37, respectively.

After filtering, the emitter-gate voltage of the transistor 33 will have the appearance shown in FIG. 2i while the emitter-gate voltage of the transistor 38 will have the appearance shown in FIG. 2j. This results in that the voltage k across the signal lamp 2 will have the appearance shown in FIG. 2k. The voltages from the secondary windings of the transformers 5 and 6 are rectified by the diodes 29, 30 and 34, 35, respectively, while the high-frequency components from chopping by the chopper device 4 are filtered out by the filters comprising coil 31 and capacitor 32 and coil 36 and capacitor 37, respectively.

The purpose of the field effect transistors 33 and 38 is to prevent one rectifier from conducting current to the load 2 when the other transformer supplies voltage, and vice versa, since both rectifiers would otherwise constitute short circuits for each other, in respect of the output voltage of the apparatus.

The field effect transistors 33 and 38 may of course be replaced, either by bipolar-type transistors or by thyristors. This also applies to the field effect transistors 23 and 26 in the chopper device 4.

There will thus be no power supplied to the signal lamp 2, when the high-frequency input signal b is interrupted, since no voltage is obtained across the respective primary windings 7 and 8 of the transformers 5 and 6. The interruption of power will thus be reliable within the meaning implied in railway signalling technology, since no component failure can give rise to the high-frequency control signal which provides the chopping necessary for the output voltage a of the low-frequency source 1 to be transferred to the secondary side of the transformers 5 and 6. These transformers 5 and 6 are further implemented such that they can only transfer high-frequency energy. Accordingly, such component failures will be harmless as could cause the voltage from the low frequency source 1 to be directly applied to the primary windings, since the transformers become saturated when low-frequency voltage is applied to their primary windings. Since the primary and secondary sides of the transformers 5 and 6 are mutually, galvanically isolated by an isolation of a high isolation class, the probability of leakage voltage is so small that it may be neglected.

In accordance with the invention there has thus been provided a method and apparatus for the secure interruption of the supply of power from a low-frequency or direct voltage source to a load.

I claim:

1. Method of reliably controlling the energizing of a load comprising providing a source voltage having a low frequency or direct-current voltage, controllably providing a chopping voltage having a frequency substantially greater than said low frequency, said chopping voltage being controllably switchable between on and off states, chopping said source voltage in response to said chopping voltage such that, when said chopping voltage is present, a high-frequency voltage is generated, inductively coupling said high-frequency voltage to an output circuit containing said load solely through a high-frequency path with galvanic isolation and rectifying and filtering the high-frequency voltage induced in said output circuit such that when the chopping voltage is in on state the load will be supplied with voltage corresponding to voltage from said source whereas when the chopping voltage is in off state no leakage voltage can be transmitted across said inductive coupling and there will be no voltage at said load whereby to reliably interrupt supply of voltage to said load and when the source voltage has a low frequency, the voltage applied to the load has substantially the same waveform as the source voltage.

2. Apparatus for reliably effecting interruption of the supply of electric power from a low-frequency or direct-current voltage source to a load comprising high-frequency voltage generating means for generating a high-frequency control voltage, said high-frequency voltage generating means being controllably switchable between on and off states, high-frequency control voltage responsive chopper means for chopping the output voltage of said voltage source to a high-frequency output voltage only when said high-frequency control voltage is present, and galvanically isolating high-frequency coupling means for coupling said high-frequency output voltage to said load, said high-frequency coupling means comprising a transformer means and rectifier and filtering means connecting said transformer means to said load whereby the voltage applied to said load has the same waveform as said voltage source so that when said high-frequency voltage generating means is in on state, the load will be supplied with voltage corresponding to voltage from said source whereas when said high-frequency voltage generating means is in off state no voltage, inclusive of leakage voltage, can be transmitted across said transformer means and there will be no voltage at said load whereby to reliably interrupt supply of voltage to said load.

* * * * *